US012442341B2

(12) United States Patent
Beinborn et al.

(10) Patent No.: US 12,442,341 B2
(45) Date of Patent: Oct. 14, 2025

(54) EXHAUST TEMPERATURE CONTROLS FOR ENGINE OPERATION WITH CYLINDER DEACTIVATION

(71) Applicant: Cummins Inc., Columbus, IN (US)

(72) Inventors: Aaron William Beinborn, Columbus, IN (US); Lyle E. Kocher, Whiteland, IN (US); J. Steven Kolhouse, Columbus, IN (US); Suk-Min Moon, Greenwood, IN (US); Sriram S. Popuri, Greenwood, IN (US); Janardhan Kodavasal, Indianapolis, IN (US); Ved Merchant, Columbus, IN (US); Kristopher R. Bare, Columbus, IN (US); Avra Brahma, Fishers, IN (US)

(73) Assignee: Cummins Inc., Columbus, IN (US)

( * ) Notice: Subject to any disclaimer, the term of this patent is extended or adjusted under 35 U.S.C. 154(b) by 246 days.

(21) Appl. No.: 17/817,096

(22) Filed: Aug. 3, 2022

(65) Prior Publication Data
US 2022/0372926 A1  Nov. 24, 2022

Related U.S. Application Data

(63) Continuation of application No. PCT/US2021/016148, filed on Feb. 2, 2021.
(Continued)

(51) Int. Cl.
*F02D 41/02* (2006.01)
*F02D 13/06* (2006.01)
(Continued)

(52) U.S. Cl.
CPC ......... *F02D 41/0245* (2013.01); *F02D 13/06* (2013.01); *F02D 41/0087* (2013.01);
(Continued)

(58) Field of Classification Search
CPC .. F02D 13/06; F02D 41/0007; F02D 41/0087; F02D 41/024; F02D 41/0245;
(Continued)

(56) References Cited

U.S. PATENT DOCUMENTS 6,647,947 B2    11/2003  Boyer et al.
6,813,879 B2 * 11/2004  Wagner ................. F02D 41/405
                                               60/284
(Continued)

FOREIGN PATENT DOCUMENTS

CH               710284            4/2016
CN       109209569 A  *  1/2019  ............... F01N 3/02
(Continued)

OTHER PUBLICATIONS

International Search Report and Written Opinion, PCT Appln. No. PCT/US21/016148, Jul. 13, 2021, 18 pgs.
(Continued)

*Primary Examiner* — Mark L. Greene
(74) *Attorney, Agent, or Firm* — Taft, Stettinius & Hollister LLP

(57) ABSTRACT

A system and method of controlling operation of an internal combustion engine are provided. The method includes performing a cylinder deactivation operation while running the engine, selecting at least one of the plurality of temperature maintenance actions to increase an exhaust temperature, and performing at least one of the plurality of temperature maintenance actions effective to increase the exhaust temperature. The plurality of temperature maintenance actions may include one or more of a charge air cooler bypass operation, an EGR cooler bypass operation, an aftertreatment system heater operation, a turbocharger bypass operation, a turbocharger geometry adjustment operation, an
(Continued)

intake air throttle adjustment operation, and a delayed injection timing operation, or combinations thereof.

19 Claims, 11 Drawing Sheets

Related U.S. Application Data

(60) Provisional application No. 62/970,818, filed on Feb. 6, 2020.

(51) Int. Cl.
*F02D 41/00* (2006.01)
*F02D 41/40* (2006.01)
*F02D 41/14* (2006.01)

(52) U.S. Cl.
CPC ........ *F02D 41/401* (2013.01); *F02D 41/0007* (2013.01); *F02D 2041/0012* (2013.01); *F02D 41/1446* (2013.01); *F02D 41/405* (2013.01); *F02D 2200/0802* (2013.01)

(58) Field of Classification Search
CPC ............. F02D 41/0255; F02D 41/1446; F02D 41/401; F02D 41/402; F02D 41/405; F02D 2041/0012; F02D 2200/0802; F02D 2200/0804
See application file for complete search history.

(56) References Cited

U.S. PATENT DOCUMENTS

| | | | |
|---|---|---|---|
| 8,145,410 B2 | 3/2012 | Berger et al. | |
| 8,468,801 B2 * | 6/2013 | Shimizu | F02B 37/18 60/287 |
| 8,833,345 B2 | 9/2014 | Pochner et al. | |
| 9,200,587 B2 | 12/2015 | Serrano | |
| 9,239,037 B2 | 1/2016 | Carlson et al. | |
| 9,249,748 B2 | 2/2016 | Verner | |
| 9,394,834 B2 | 7/2016 | Yacoub | |
| 9,523,319 B2 | 12/2016 | Wilson | |
| 9,670,855 B2 * | 6/2017 | Dickson | F02D 41/024 |
| 9,968,886 B2 | 5/2018 | Balenovic et al. | |
| 2010/0050993 A1 | 3/2010 | Zhao et al. | |
| 2011/0146269 A1 | 6/2011 | Hepburn et al. | |
| 2014/0053804 A1 | 2/2014 | Rayl et al. | |
| 2014/0069379 A1 | 3/2014 | Beikmann | |
| 2016/0186672 A1 | 6/2016 | Mehrotra et al. | |
| 2019/0242311 A1 | 8/2019 | Lyon et al. | |
| 2020/0011257 A1 | 1/2020 | Stretch et al. | |

FOREIGN PATENT DOCUMENTS

| | | | | |
|---|---|---|---|---|
| DE | 102005015999 A1 * | 10/2006 | ........... | F01N 13/009 |
| EP | 3346116 | 7/2018 | | |
| KR | 101865913 | 6/2018 | | |
| WO | 2011041576 | 4/2011 | | |
| WO | WO-2015035133 A1 * | 3/2015 | ............ | F01N 11/002 |
| WO | WO-2018144378 A1 * | 8/2018 | ............... | F01N 9/00 |

OTHER PUBLICATIONS

Extended European Search Report, EP Application No. 25161112.5, dated Jun. 5, 2025, 10 pgs.

* cited by examiner

1

EXHAUST TEMPERATURE CONTROLS FOR ENGINE OPERATION WITH CYLINDER DEACTIVATION

CROSS-REFERENCE

The present application is a continuation of PCT Application No. PCT/US21/16148 filed on Feb. 2, 2021, which claims priority to and the benefit of U.S. Application No. 62/970,818 filed Feb. 6, 2020, the disclosures of which are hereby incorporated by reference.

BACKGROUND

The present application relates to exhaust temperature controls for engine operation with cylinder deactivation. Exhaust temperature controls are desirable in a number of engine applications, including compression ignition engines such as diesel engines, spark ignition engines such as gasoline engines or gaseous fuel engines, and dual fuel engines. There are numerous reasons to utilize exhaust temperature controls including, for example, respecting the thermal limits of engine components exposed to exhaust gas, ensuring safe operation, maximizing engine performance, and mitigating emissions. Use of exhaust temperature controls may be utilized to provide sufficient or optimal operating temperatures of exhaust aftertreatment system components including catalysts, such as selective catalytic reduction (SCR) catalysts and other catalysts which contribute to mitigation of emissions has proven particularly challenging. Conventional proposals for exhaust temperature controls suffer from a number of problems and unmet needs including those respecting exhaust temperature controls for engine operation with cylinder deactivation. There remains a substantial need for the unique apparatuses, methods, systems, and techniques disclosed herein.

DISCLOSURE OF EXAMPLE EMBODIMENTS

For the purposes of clearly, concisely and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Example embodiments comprise unique apparatuses, methods, systems, and techniques for controlling an internal combustion engine with aftertreatment or exhaust thermal management. Some embodiments include performing a cylinder deactivation operation while running the engine, selecting at least one of a plurality of temperature maintenance actions to increase an exhaust temperature, and performing at least one of the plurality of temperature maintenance actions effective to increase the exhaust temperature. The plurality of temperature maintenance actions may include one or more of a charge air cooler bypass operation, an EGR cooler bypass operation, an aftertreatment system heater operation, a turbocharger bypass operation, a turbocharger geometry adjustment operation, an intake air throttle adjustment operation, and a delayed injection timing operation. One or more of the plurality of temperature maintenance actions may be performed in combination with cylinder deactivation (CDA) including, for example, combinations including at least one of the foregoing temperature maintenance actions in combination with CDA.

BRIEF DESCRIPTION OF THE DRAWINGS

FIGS. 6A and 4B are flow diagrams illustrating certain aspects of an example control process for an internal combustion engine system.

DETAILED DESCRIPTION OF EXAMPLE EMBODIMENTS

Figure 1A:
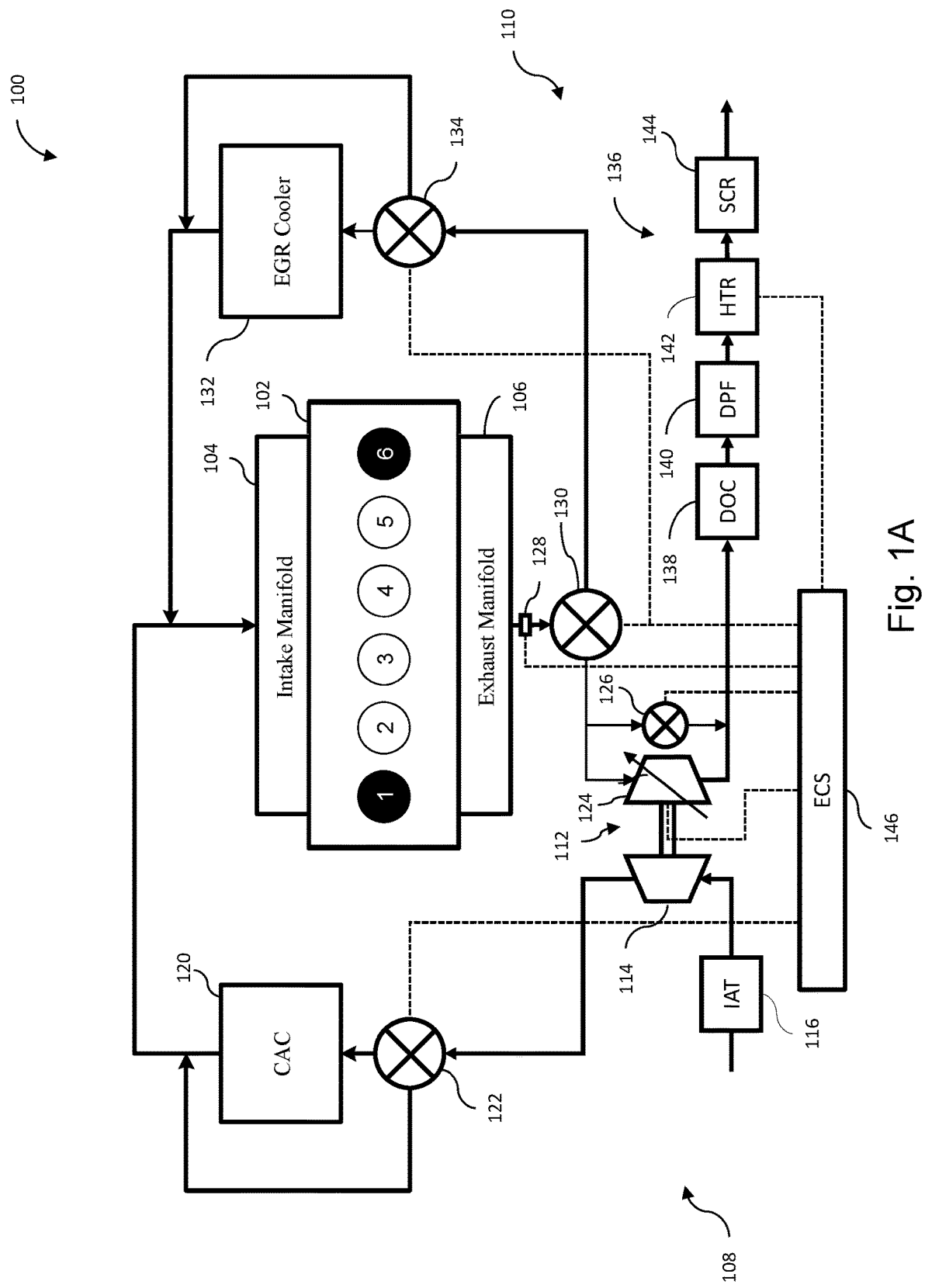
FIGS. 1A and 1B are schematic diagrams illustrating certain aspects of an example internal combustion engine system.
Figure 1B:
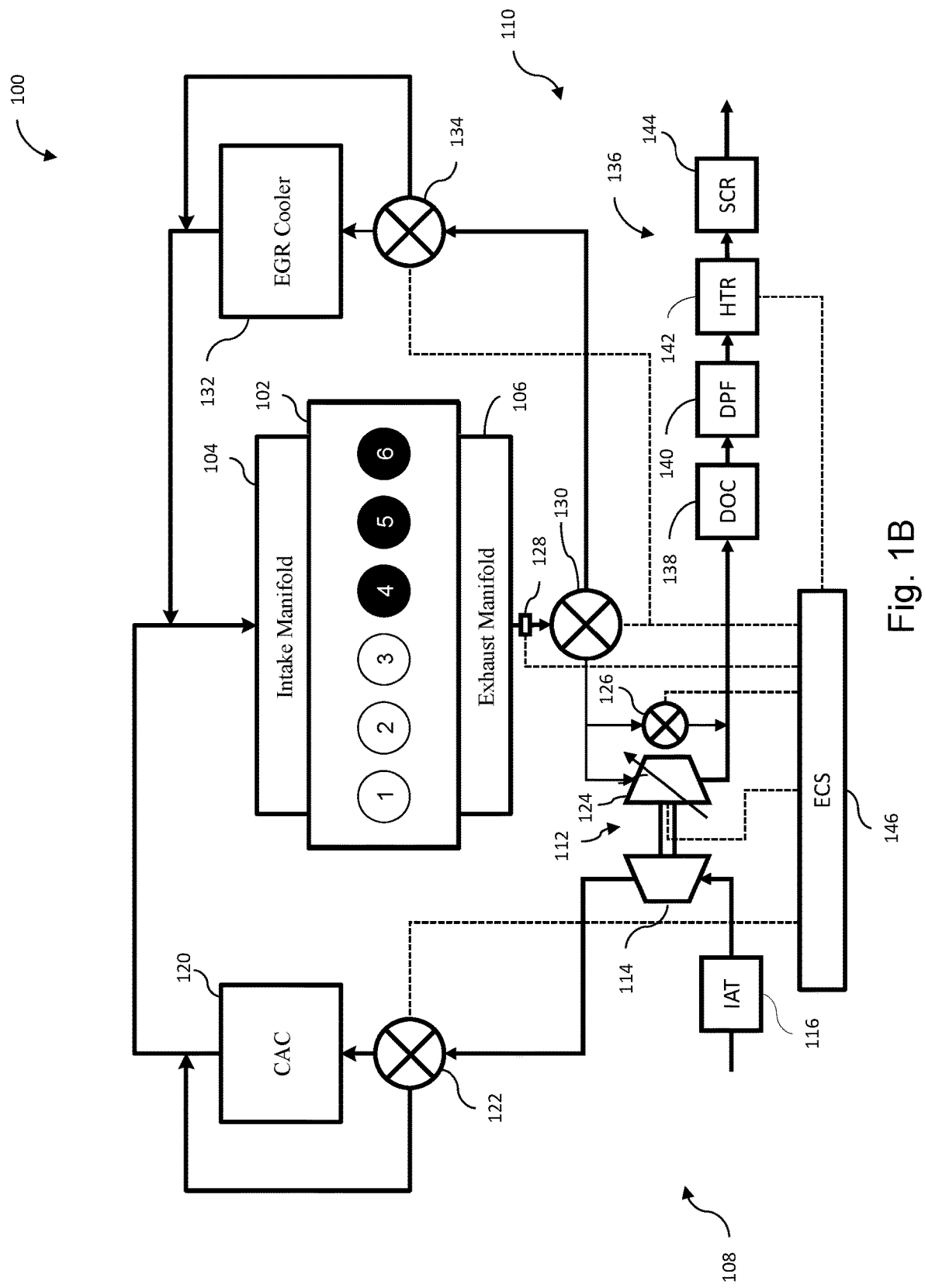

With reference to FIGS. 1A and 1B, there are illustrated schematic views depicting certain aspects of an example engine system 100 including an engine 102. In the illustrated form, the engine 102. It shall be appreciated that the illustrated embodiment of system 100 is but one example of an engine system contemplated by the present disclosure and that a variety of other engine systems including additional or alternate components and features as well as other engine systems not including one or more of the features of the illustrated embodiment are contemplated.

In the illustrated embodiment, system 100 includes an intake system 108 and an exhaust system 110. The engine 102 is in fluid communication with the intake system 108 through which charge air enters an intake manifold 104 and is also in fluid communication with the exhaust system 110, through which exhaust gas resulting from combustion exits by way of an exhaust manifold 106. The engine 102 includes a number of cylinders (e.g., cylinders 1 through 6) forming combustion chambers in which a charge flow mixture of fuel and air is combusted. For example, the energy released by combustion powers the engine 102 via pistons in the cylinders connected to a crankshaft. Intake valves control the admission of charge air into the cylinders, and exhaust valves control the outflow of exhaust gas through exhaust manifold 106 and ultimately to the atmosphere. It shall be appreciated that the exhaust manifold 106 may be a single manifold or multiple exhaust manifolds.

The engine 102 may be controlled and operated to provide deactivation of various ones of cylinders 1 through 6. For example, FIG. 1A illustrates the engine 102 with cylinders 1 and 6 deactivated and the other cylinders are activated. FIG. 1B illustrates another example wherein cylinders 4, 5, and 6 of the engine 102 are deactivated and the other cylinders are activated. In other examples cylinders, 2 and 5 of the engine may be in a deactivated state. In further examples, cylinders 2, 3, 4, and 5 may be in a deactivated state. Other forms and combinations of cylinder deactivation are also contemplated as will occur to one of skill in the art with the benefit of the present disclosure. For example, in some systems and modalities, up to four cylinders of a six-cylinder engine may be deactivated to provide more aggressive thermal management.

It shall be further appreciated that CDA operation may be provided in the example forms illustrated and described in detail herein as well as a number of other forms which may vary, for example, with respect to the number of cylinders of a given engine system, the number of those cylinders which may be deactivated at or over a given time or period of engine operation, and the sequence and order with which various cylinders may be dynamically deactivated and reactivated. For a given engine configuration there may be a CDA operation which maximizes thermal management or the ability to increase exhaust temperature or the temperature of aftertreatment components, while preserving desired engine performance and stability. Such operation is an example of and may be referred to as aggressive thermal management. In one example of aggressive thermal management, a six-cylinder engine may operate with up to four cylinders deactivated and only two cylinders active. Such CDA operation may be utilized in connection with a number of operational states of an engine system including, for example, lower engine operating loads (e.g., loads less than or equal to 3 bar BMEP or loads in a range up to 15%-20% or a nominal load, a maximum load, or a rated load). Such lower engine operating loads may occur, for example, when the engine runs through low load cycles, such as extended idle operation.

The turbocharger 112 includes a compressor 114 configured to receive filtered intake air via an intake air throttle (IAT) 116 of the intake system 108 and operable to compress ambient air before the ambient air enters the intake manifold 104 of the engine 102 at increased pressure. The air from the compressor 114 is pumped through the intake system 108, to the intake manifold 104, and into the cylinders of the engine 102, typically producing torque on the crankshaft. The intake system 108 includes an intake air throttle (IAT) 116 flow coupled with a charge air cooler (CAC) 120 which is operable to cool the charge flow provided to the intake manifold 104. The intake system 108 also includes a CAC bypass valve 122 which can be opened to route a portion or all of the charge flow to bypass the CAC 120. Adjusting the bypass position of the CAC bypass valve 122 increasingly raises the temperature of the gas returned to the intake manifold 104.

It is contemplated that in the engine system 100, the turbocharger 112 may be a variable geometry turbocharger (VGT) or a fixed geometry turbocharger. A variable geometry turbine allows significant flexibility over the pressure ratio across the turbine. In diesel engines, for example, this flexibility can be used for improving low speed torque characteristics, reducing turbocharger lag and driving exhaust gas recirculation flow. In an example embodiment, the VGT 124 can be adjusted to increase engine load and thereby configured to increase exhaust gas temperature. The engine system 100 also includes a turbine bypass valve 126 to bypass the turbocharger 112. Since cooler ambient air is introduced at the turbocharger 112, opening the turbine bypass valve 126 allows for the turbocharger 112 to be bypassed and maintain a higher intake air temperature at the intake manifold 104.

The exhaust system 110 includes an exhaust gas temperature sensor 128 to sense the temperature of the gas exiting the exhaust manifold 106. The exhaust system 110 includes an exhaust gas recirculation (EGR) valve 130 which recirculates a portion of exhaust gas from the exhaust gas manifold 106 back to the intake manifold 104. The exhaust system 110 includes an EGR cooler (EGR-C) 118 which cools the gas exiting the exhaust gas manifold 106 before the gas returns to the intake manifold 104. The exhaust system 110 may also include an EGR-C bypass valve 134 which can be opened to route a portion or all of the recirculated exhaust gas from the exhaust gas manifold 106 to bypass the EGR-C 132. By increasing the amount of gas that bypasses the EGR-C 132, the temperature of the gas returning to the intake manifold 104 is increased. It shall be appreciated that the intake system 108 and/or the exhaust system 110 may further include various components not shown, such as additional coolers, valves, bypasses, intake throttle valves, exhaust throttle valves, and/or compressor bypass valves, for example.

The system 100 includes an exhaust aftertreatment (AT) system 136 which includes a diesel oxidation catalyst (DOC) 138, a diesel particulate filter (DPF) 140, aftertreatment (AT) heater 142, and a selective catalytic reduction (SCR) 144. In the example embodiment, the AT heater 142 is optionally included in the AT system 136 to increase the temperature of the exhaust gas provided to the SCR 144 within the AT system 136. It should be noted that AT heater 142 can include one or more electric and/or fuel-based heaters.

The engine system 100 further includes a controller 146 structured to perform certain operations and to receive and interpret signals from any component and/or sensor of the engine system 100. It shall be appreciated that the controller 146 may be provided in a variety of forms and configurations including one or more computing devices forming a whole or a part of a processing subsystem having non-transitory memory storing computer-executable instructions, processing, and communication hardware. The controller 146 may be a single device or a distributed device, and the functions of the controller 146 may be performed by hardware or software. The controller 146 is in communication with any actuators, sensors, datalinks, computing devices, wireless connections, or other devices to be able to perform any described operations.

The controller 146 may include one or more non-transitory memory devices configured to store instructions in memory which are readable and executable by the controller 146 to control operation of engine 102 as described herein. Certain control operations described herein include operations to determine one or more parameters. Controller 146 may be configured to determine and may perform acts of determining in a number of manners, for example, by calculating or computing a value, obtaining a value from a lookup table or using a lookup operation, receiving values from a datalink or network communication, receiving an electronic signal (e.g., a voltage, frequency, current, or pulse-width modulation (PWM) signal) indicative of the value, receiving a parameter indicative of the value, reading the value from a memory location on a computer-readable medium, receiving the value as a run-time parameter, and/or by receiving a value by which the interpreted parameter can be calculated, and/or by referencing a default value that is interpreted to be the parameter value.

Figure 2:
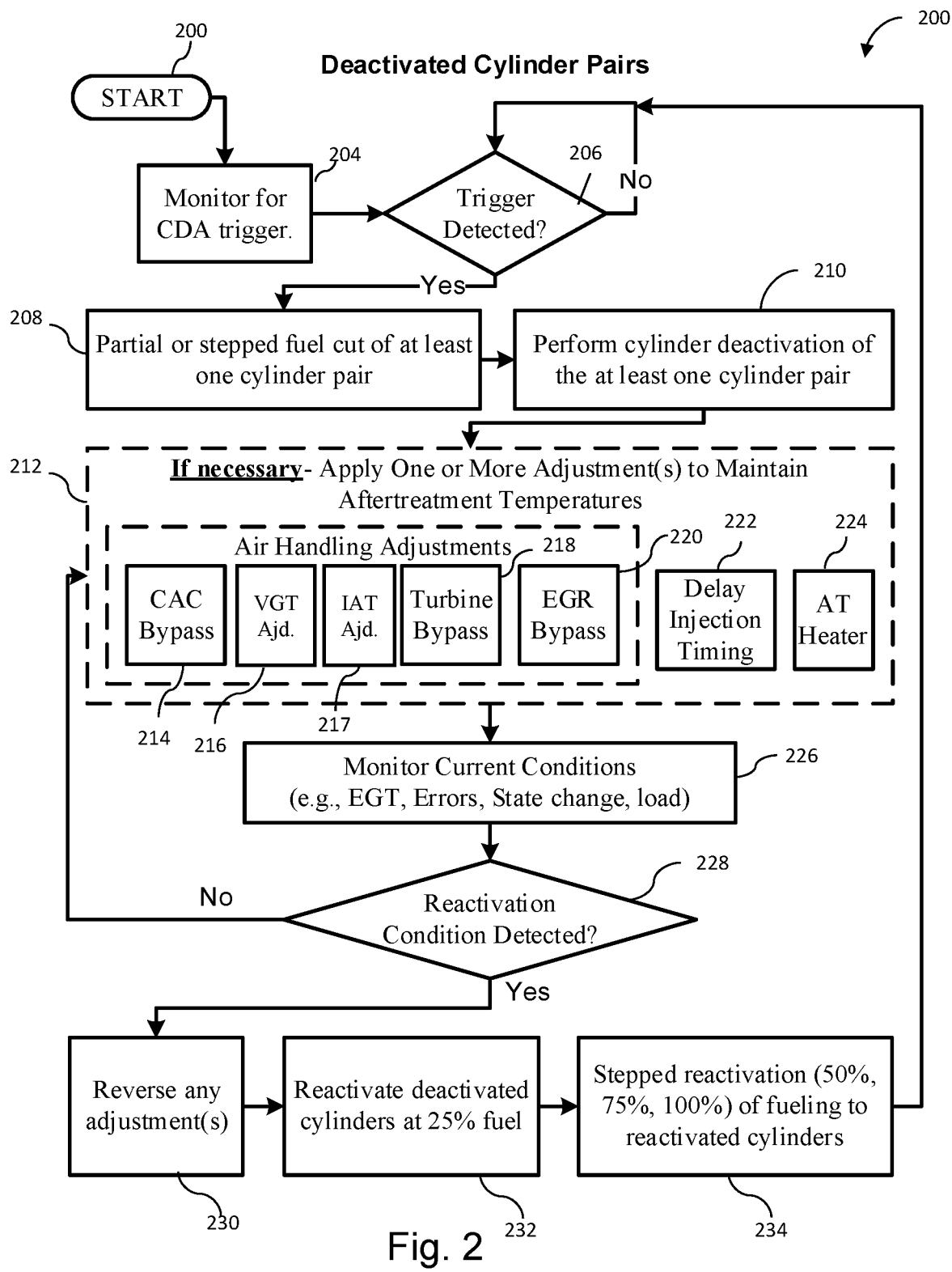
FIG. 2 is a flow diagram illustrating certain aspects of an example control process for an internal combustion engine system.

Controller 146 is one example of a component of an integrated circuit-based electronic control system (ECS) that may be configured to control various operational aspects of engine system 100 and engine 102 as described in further detail herein. An ECS according to the present disclosure may be implemented in a number of forms and may include a number of different elements and configurations of elements. In certain forms, an ECS may incorporate one or more microprocessor-based or microcontroller-based electronic control units sometimes referred to as electronic control modules. An ECS according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an ECS and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein With reference to FIG. 2, there is illustrated a flow diagram of an example procedure 200 for deactivating cylinders in engine system 100. Procedure 200 may be implemented and executed in connection with one or more components of the ECS 146 such as one or more of the components of the ECS 146 described above in connection with engine system 100 or in a number of other ECS components. Procedure 200 begins at start operation 202 which initiates a procedure for monitoring a number of conditions including, but not limited to, load conditions on the engine, extended engine idle time, detected driving conditions, low-load need when moving downhill or moving in stop-and-go traffic, look-ahead operating conditions, and changing transmission state. Operation 202 proceeds to operation 204 which monitors a number of conditions that may trigger cylinder deactivation.

From operation 204, procedure 200 proceeds to conditional 206 which determines, based on the cylinder deactivation conditions, if a cylinder deactivation trigger condition is detected. If conditional 206 determines that a cylinder deactivation trigger is not detected, procedure 200 returns to conditional 206 and continues to monitor the engine system 100 for a trigger condition. If conditional 206 determines that a cylinder deactivation trigger is detected, procedure 200 continues to operation 208 which performs a partial or stepped fuel cut of at least one cylinder in the engine. Prior to cylinder deactivation, all cylinders receive normal fueling activity (e.g., 100%). At the initialization of cylinder deactivation, a partial or stepped fuel cut begins at, for example, 75% and proceeds to operation 210 which performs a complete fuel cut for all cycles during the cylinder deactivation of the at least one cylinder. During cylinder deactivation, intake and/or exhaust valves are deactivated for each of the deactivated cylinders while active cylinders receive 100% fueling activity. To maintain an efficiently operated aftertreatment system, an actual exhaust gas temperature is monitored and compared to a target gas temperature. In other example embodiments, a predicted or estimated temperature may be determined or a rate of temperature change may be measured or estimated.

From operation 210, procedure 200 proceeds to operation 212 which determines if an adjustment to the engine system 100 is needed to maintain or achieve the targeted exhaust gas temperature. In the example embodiment, procedure 200 may be configured to perform a number of engine operational adjustments in combination with CDA operation of the engine, for example, a CAC bypass operation 214, a VGT position adjustment operation 216, an IAT position adjustment operation 217, a turbine bypass operation 218, an EGR bypass operation 220, a delay injection timing operation 222, and an aftertreatment heater operation 224. The injection timing can include changing the timing of the injection to a time after top dead center (TDC_ of the combustion stroke to cause less of the fuel to burn leaving some fuel that gets passed to the AT system to drive temperatures there. For each cylinder, this could be a single injection or multiple injections (multi-pulse). Additionally, one or more injections could also be performed in each of one or more cylinders during the exhaust stroke so that fuel is drawn out of the exhaust manifold into the AT system to raise temperatures. It shall be further understood that delayed injection timing includes one or multiple late injections, one or multiple post-injections, and the like.

In addition to making adjustments based on temperature, adjustments may be based on a number of conditions such as, but not limited to, engine conditions, engine idling time, engine transmission state, actual or estimated fuel consumed, look-ahead data, and other adjustments already applied. During cylinder deactivation, additional adjustments can be dynamically applied and existing adjustments can be modified or removed based on conditions.

In addition, the operational adjustments may include performing one or more additional post-injections of fuel directly into one or more of the active cylinders of engine 102 after the normal fuel injections in those active cylinders. In one or more embodiments, each of these post injections may contain a different amount of fuel (e.g., less fuel) than the amount of fuel delivered during the normal injections in those active cylinders. The number of post injections and amount of fuel delivered in each individual post-injection can be varied based on a number of factors including, but not limited to, exhaust temperatures, current engine conditions, the number of active or inactive cylinders, and current environmental conditions.

From operation 212, procedure 200 continues operation 226 which monitors current cylinder deactivation conditions. From operation 226, procedure 200 proceeds to conditional 228 which determines if reactivation of the deactivated cylinders is detected. Procedure 200 may monitor a number of conditions to determine reactivation such as, but not limited to, the engine exiting a stop-and-go state, increased engine load, changed driving conditions, detected errors during cylinder deactivation, and engine transmission state. If conditional 228 determines that a reactivation condition is not detected, procedure 200 returns to operation 212 and continues to monitor for a reactivation condition of the cylinders. If conditional 228 determines that a reactivation condition is detected, procedure 200 proceeds to operation 230 which reverses any adjustments made during cylinder deactivation. From operation 230, procedure 200 continues to operation 232 which may increase fuel in the deactivated cylinders to 25%. From operation 232, procedure 200 continues to operation 234 which performs a stepped reactivation (e.g., fueling) to reactivate the deactivated cylinders (e.g., 50% to 75% to 100% fueling). To reactivate the deactivated cylinders, a corresponding decrease fueling to the activate cylinders is applied based on torque requirements and reactivated cylinders. Timing adjustments to the active cylinders may also be applied based on torque requirements and reactivated cylinders. To reduce torque spikes, fueling of the deactivated cylinders is gradually increased or stepped.

Figure 3:
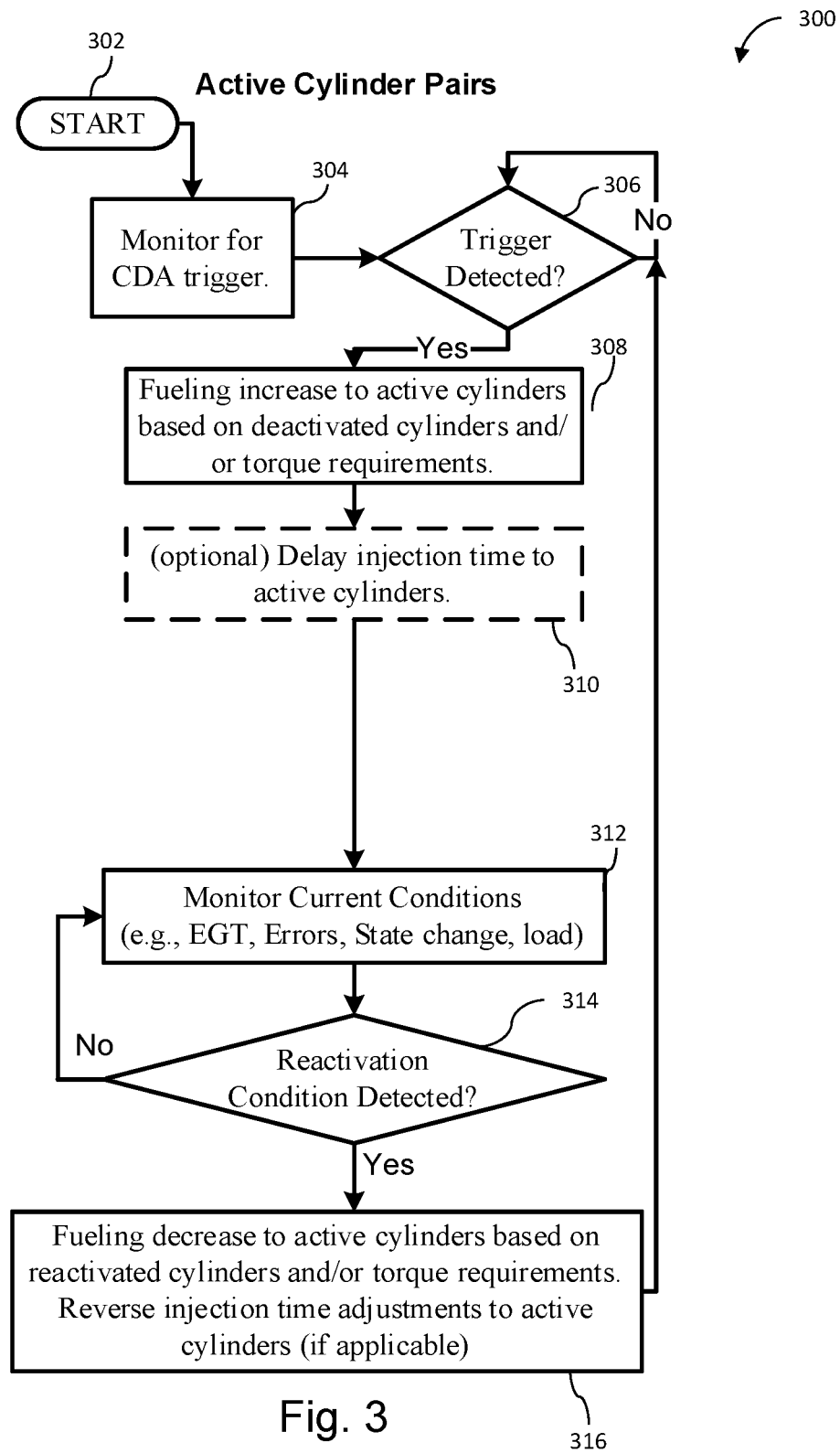
FIG. 3 is a flow diagram illustrating certain aspects of an example control process for an internal combustion engine system.

With reference to FIG. 3, there is illustrated a flow diagram of an example procedure 300 for fueling active cylinders in engine system 100 when at least one cylinder is deactivated. Procedure 300 may be implemented and executed in connection with one or more components of the ECS 146 such as one or more of the components of the ECS 146 described above in connection with engine system 100 or in a number of other ECS components. Procedure 300 begins at start operation 302 to initiate a procedure for monitoring cylinder deactivation conditions. Operation 302 proceeds to operation 304 which monitors a number of conditions which may trigger cylinder deactivation. From operation 304, procedure 300 proceeds to conditional 306 which determines if a cylinder deactivation trigger condition is detected. If conditional 306 determines that a cylinder deactivation trigger is not detected, procedure 300 returns to conditional 306 and continues to monitor the engine system 100 for a trigger condition. If conditional 306 determines that a cylinder deactivation trigger is detected, procedure 300 continues to operation 308 which increases fueling to the active cylinders based on deactivated cylinders and torque requirements. Optionally, from operation 308, procedure 300 may proceed to operation 310 which delays injection time to the active cylinders with the increase in fueling to the active cylinders to maintain torque requirements, raise exhaust temperatures, and maintain peak combustion pressure. From operation 308 (or optionally operation 310, procedure 300 then proceeds to operation 312 which monitors cylinder deactivation conditions. From operation 312, procedure 300 proceeds to conditional 314 which determines if reactivation of the deactivated cylinders is detected. In the example embodiment, procedure 300 may monitor a number of conditions to determine reactivation such as, but not limited to, the engine exiting a stop-and-go state, increased engine load, changed driving conditions, detected errors during cylinder deactivation, and engine transmission state. If conditional 314 determines that reactivation of the cylinders is not detected, procedure 300 returns to conditional 314 and continues to monitor the engine system 100 for a reactivation condition. If reactivation is detected, procedure 300 proceeds to operation 316 which decreases fueling in the active cylinders based on torque requirements and reactivated cylinders. Timing adjustments to the active cylinders may also be applied based on torque requirements and reactivated cylinders.

Figure 4A:
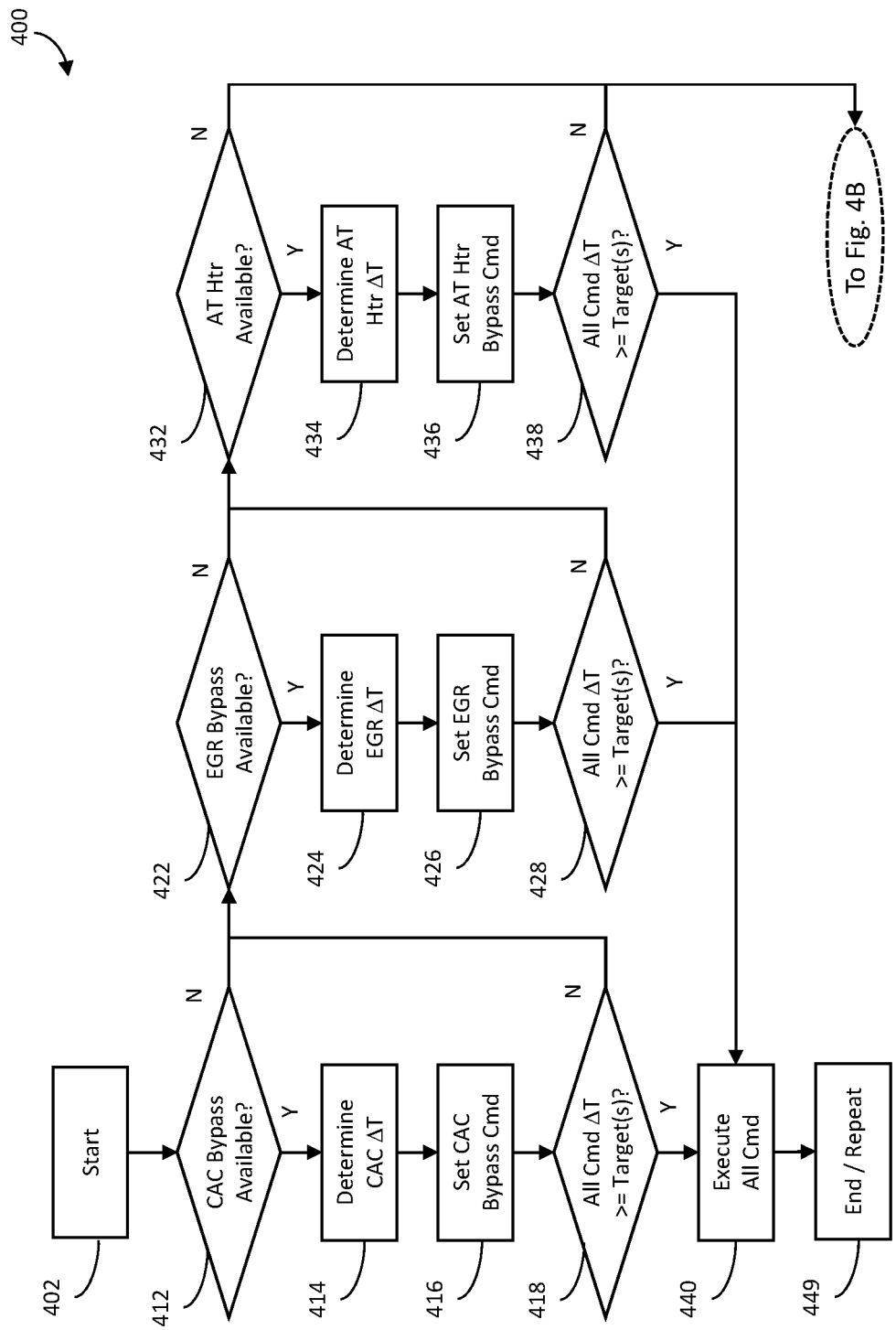
FIGS. 4A and 4B are flow diagrams illustrating certain aspects of an example control process for an internal combustion engine system.
Figure 4B:
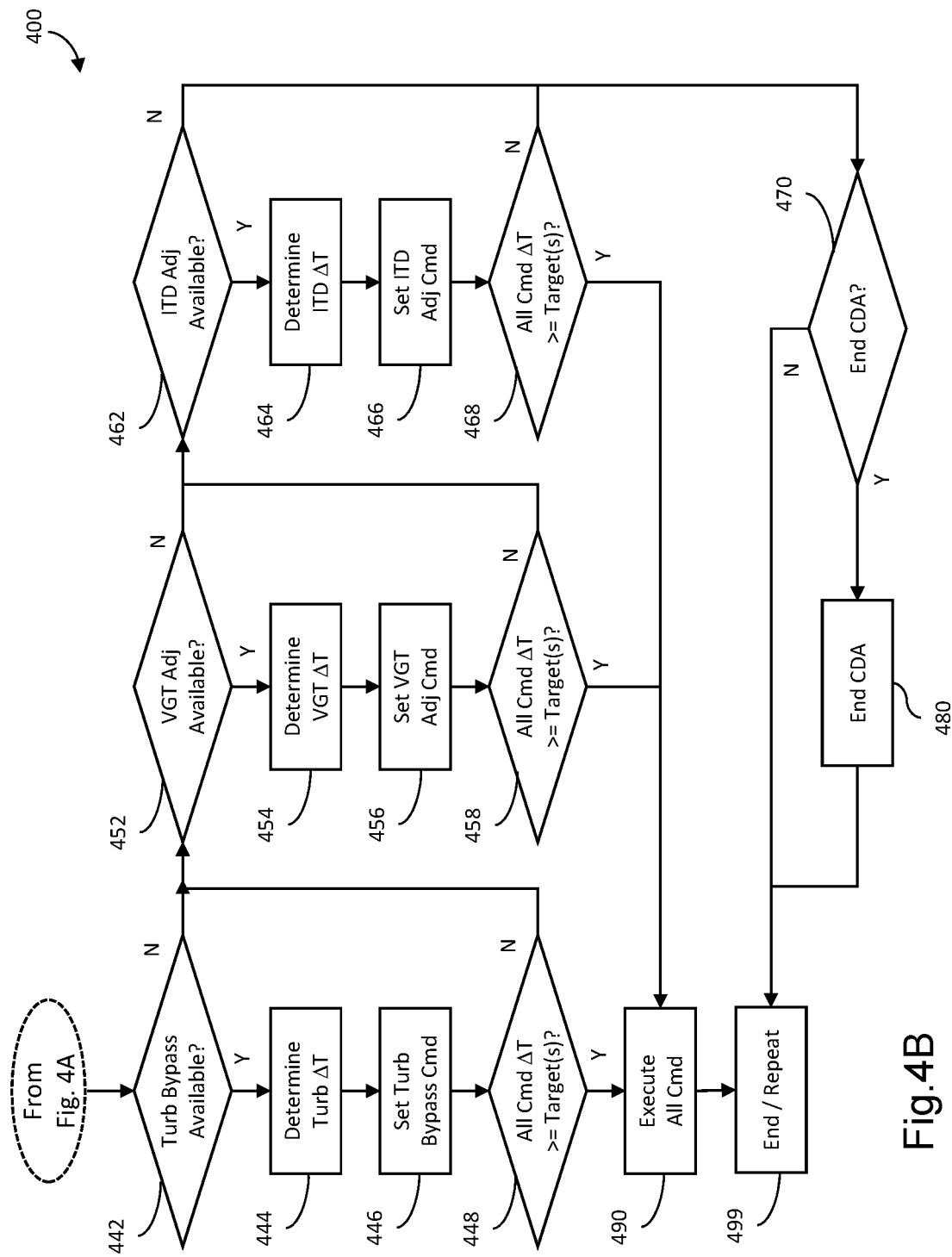

With reference to FIGS. 4A and 4B there is illustrated a flow diagram of an example procedure 400 for determining one or more air adjustments to maintain aftertreatment temperatures during cylinder deactivation. Procedure 400 may be implemented and executed in connection with one or more components of the ECS 146 such as one or more of the components of the ECS 146 described above in connection with engine system 100 or in a number of other ECS components. It shall be appreciated that the engine system 100 may or may not be configured with the example components and controls illustrated and described in connection with FIGS. 1A and 1B. For example, one or more of the illustrated CAC bypass, EGR bypass, AT Heater, and a VGT may not be present in certain implementations of system 100. In some embodiments AT system 136 may be configured in an arrangement/order that is different from the illustrated arrangement. In the example embodiment, a CAC, EGR system, AT Heater, and VGT may be provided to adjust exhaust gas temperature in the AT system 136.

Procedure 400 begins at start operation 402 and proceeds to conditional 412 which determines if a CAC bypass is available. Conditional 412 may determine if a CAC bypass is available by evaluating one or more criteria, for example, one or more engine configuration criteria indicating whether a CAC bypass is present in the engine system executing procedure 400 and/or one or more operational criteria indicating whether the current operating state of the system permits adjustment of the CAC bypass (for example, whether an error condition or whether CAC bypass is already open or already maximally open). If conditional 412 determines that the CAC bypass is available, procedure 400 proceeds to operation 414 which determines a temperature difference between a target exhaust gas temperature and an actual gas temperature from the CAC. From operation 414, procedure 400 then proceeds to operation 416 which sets a CAC bypass command to bypass the CAC. From operation 416, procedure 400 proceeds to conditional 418 which determines if the target temperature is reached by opening the CAC bypass. If conditional 418 determines the target temperature is reached by opening the CAC bypass, procedure 400 proceeds to operation 440 which executes a command to open the CAC bypass valve to achieve the target exhaust gas temperature in the AT system 136.

If conditional 412 determines that the CAC bypass is not available, procedure 400 proceeds to conditional 422 which determines if an EGR bypass is available. In an aspect in which conditional 412 determines that the CAC bypass is not available or in an aspect in which conditional 412 determines that the CAC bypass is available and the target temperature is not reached by opening the CAC bypass at conditional 418, procedure 400 proceeds to conditional 422 which determines if the EGR bypass is available. Conditional 422 may determine if an EGR bypass is available by evaluating one or more criteria, for example, one or more engine configuration criteria indicating whether an EGR bypass is present in the engine system executing procedure 400 and/or one or more operational criteria indicating whether the current operating state of the system permits adjustment of the EGR bypass (for example, whether an error condition or whether EGR bypass is already open or already maximally open). If conditional 422 determines that the EGR bypass is available, procedure 400 proceeds to operation 424 which determines a temperature difference between a target exhaust gas temperature and an actual gas temperature from the EGR system. From operation 424, procedure 400 then proceeds to operation 426 which sets an EGR bypass command to bypass the EGR. From operation 426, procedure 400 proceeds to conditional 428 which determines if the target temperature is reached by opening the EGR bypass. If conditional 428 determines the target temperature is reached by opening the EGR bypass, procedure 400 proceeds to operation 440 which executes a command to open the EGR bypass to achieve the target exhaust gas temperature in the AT system 136.

If conditional 422 determines that the EGR bypass is not available, procedure 400 proceeds to conditional 432 which determines if an AT Heater is available. In an aspect in which conditional 422 determines that the EGR bypass is not available or in an aspect in which conditional 422 determines that the EGR bypass is available and the target temperature is not reached by opening the EGR bypass at conditional 428, procedure 400 proceeds to conditional 432 which determines if an AT Heater is available. Conditional 432 may determine if an AT Heater is available by evaluating one or more criteria, for example, one or more engine configuration criteria indicating whether an AT Heater is present in the engine system executing procedure 400 and/or one or more operational criteria indicating whether the current operating state of the system permits adjustment of the AT Heater (for example, whether an error condition or whether AT Heater bypass is already open or already maximally open). If conditional determines that the AT Heater is available, procedure 400 proceeds to operation 434 which determines a temperature difference between a target exhaust gas temperature and an actual gas temperature in the AT system 136. From operation 434, procedure 400 then proceeds to operation 436 which sets an AT Heater bypass command to bypass the AT Heater. From operation 436, procedure 400 proceeds to conditional 438 which determines if the target temperature is reached by opening the AT Heater bypass. If conditional 438 determines that the target temperature is reached by opening the AT Heater bypass, procedure 400 proceeds to operation 440 which executes a command to open the AT Heater bypass valve to achieve the target exhaust gas temperature in the AT system 136.

If conditional 432 determines that the AT Heater is not available, procedure 400 proceeds to conditional 442 which determines if a turbo bypass is available. In an aspect in which conditional 432 determines that the AT Heater is not available or in an aspect in which conditional 432 determines that the AT Heater is available and the target temperature is not reached by opening the AT Heater bypass at conditional 438, procedure 400 proceeds to conditional 442 which determines if a turbocharger bypass is available. Conditional 442 may determine if a turbo bypass is available by evaluating one or more criteria, for example, one or more engine configuration criteria indicating whether a turbo bypass is present in the engine system executing procedure 400 and/or one or more operational criteria indicating whether the current operating state of the system permits adjustment of the turbo bypass (for example, whether an error condition or whether turbo bypass is already open or already maximally open). If conditional 442 determines that the turbocharger bypass is available, procedure 400 proceeds to operation 444 which determines a temperature difference between a target exhaust gas temperature and an actual gas temperature from the turbo. From operation 444, procedure 400 then proceeds to operation 446 which sets a turbocharger bypass command to bypass the turbocharger. From operation 446, procedure 400 proceeds to conditional 448 which determines if the target temperature is reached by opening the turbocharger bypass. If conditional 448 determines that the target temperature is reached by opening the turbocharger bypass, procedure 400 proceeds to operation 490 which executes a command to open the turbocharger bypass to achieve the target exhaust gas temperature in the AT system 136.

If conditional 442 determines that the turbocharger bypass is not available, procedure 400 proceeds to conditional 452 which determines if a VGT adjustment is available. In an aspect in which conditional 442 determines that the turbocharger bypass is not available or in an aspect in which conditional 442 determines that the turbocharger bypass is available and the target temperature is not reached by opening the turbocharger bypass at conditional 448, procedure 400 proceeds to conditional 452 to determine if a VGT adjustment is available. Conditional 452 may determine if a VGT adjustment is available by evaluating one or more criteria, for example, one or more engine configuration criteria indicating whether a VGT adjustment is present in the engine system executing procedure 400 and/or one or more operational criteria indicating whether the current operating state of the system permits adjustment of the VGT (for example, whether an error condition or whether VGT is already adjusted or already maximally adjusted). If conditional 452 determines that the VGT adjustment is available, procedure 400 proceeds to operation 454 which determines a temperature difference between a target exhaust gas temperature and an actual gas temperature from the VGT. From operation 454, procedure 400 then proceeds to operation 456 which sets a VGT adjustment command to adjust the VGT. From operation 456, procedure 400 proceeds to conditional 458 which determines if the target temperature is reached by adjusting the VGT. If conditional 458 determines that the target temperature is reached by adjusting the VGT, procedure 400 proceeds to operation 490 which executes a command to adjust the VGT to achieve the target exhaust gas temperature in the AT system 136.

If conditional 452 determines that the VGT adjustment is not available, procedure 400 proceeds to conditional 462 which determines if an Injection Time Delay (ITD) adjustment is available. In an aspect in which conditional 452 determines that the VGT adjustment is not available or in an aspect in which conditional 452 determines that the VGT adjustment is available and the target temperature is not reached by adjusting the VGT at conditional 458, procedure 400 proceeds to conditional 462 which determines if an ITD adjustment is available. Conditional 462 may determine if an ITD adjustment is available by evaluating one or more criteria, for example, one or more engine configuration criteria indicating whether an ITD adjustment is present in the engine system executing procedure 400 and/or one or more operational criteria indicating whether the current operating state of the system permits adjustment of the ITD (for example, whether an error condition or whether ITD is already adjusted or already maximally adjusted). If conditional 462 determines that the ITD adjustment is available, procedure 400 proceeds to operation 464 which determines a temperature difference between a target exhaust gas temperature and an actual gas temperature from the ITD. From operation 464, procedure 400 then proceeds to operation 466 which sets an ITD adjustment command to adjust the ITD. From operation 466, procedure 400 proceeds to conditional 468 which determines if the target temperature is reached by adjusting the ITD. If conditional 468 determines that the target temperature is reached by adjusting the ITD, procedure 400 proceeds to operation 490 which executes a command to adjust the ITD to achieve the target exhaust gas temperature in the AT system 136.

In an aspect in which conditional 462 determines that the ITD adjustment is not available or in an aspect in which conditional determines that the ITD adjustment is available and the target temperature is not reached by adjusting the ITD at conditional 468, procedure 400 proceeds to conditional 470 which determines if cylinder deactivation has ended. If conditional 470 determines that cylinder deactivation has not ended, procedure 400 proceeds to operation 499 which repeats the procedure for determining one or more air adjustments via the example components. If conditional 470 determines that cylinder deactivation has ended, procedure 400 proceeds to operation 480 to end cylinder deactivation. It shall be appreciated that any of the air adjustments may end at operation 449 or operation 499 after procedure 400 executes an air adjustment command at operation 440 or operation 490.

Figure 6A:
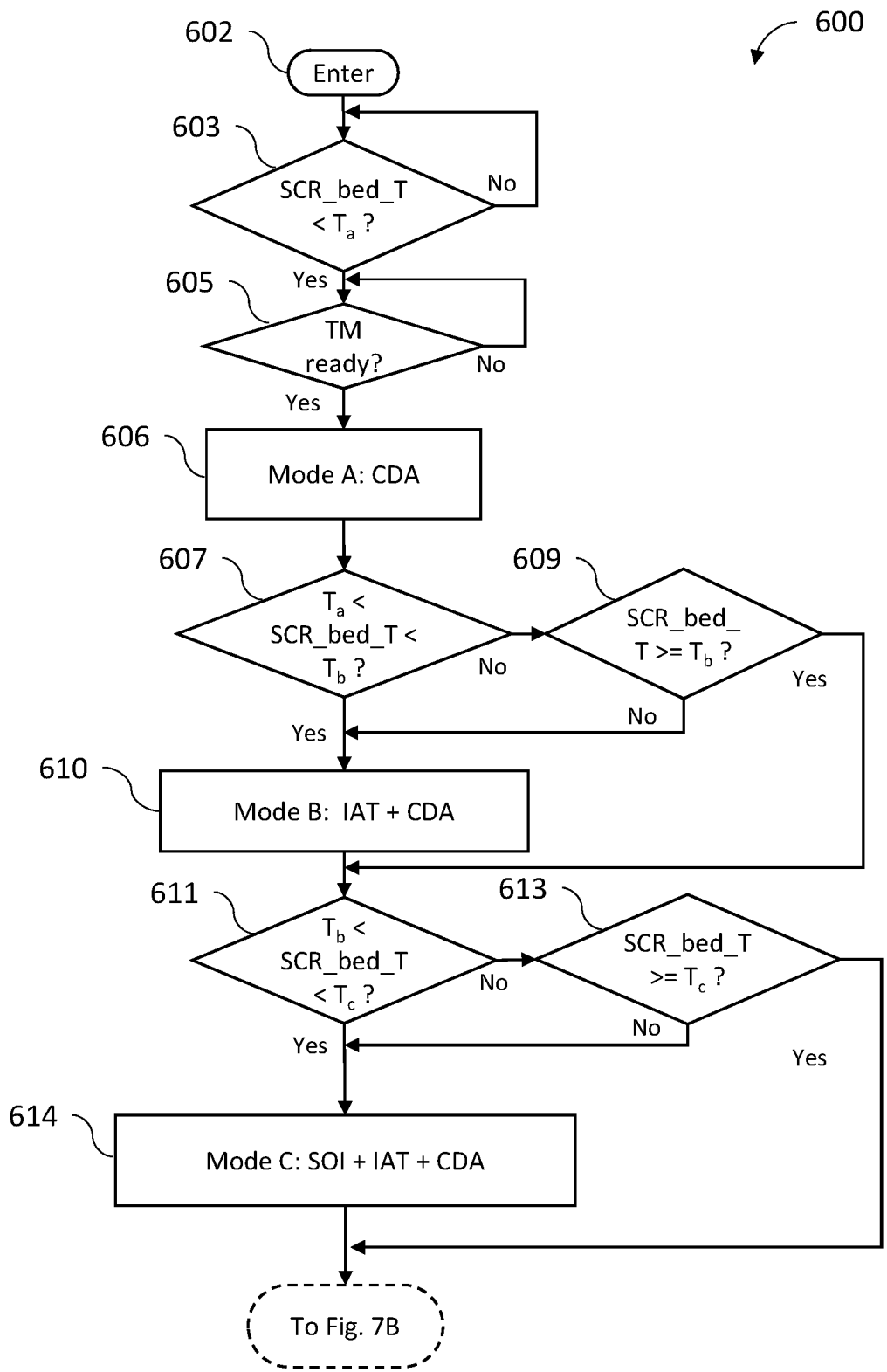
Figure 6B:
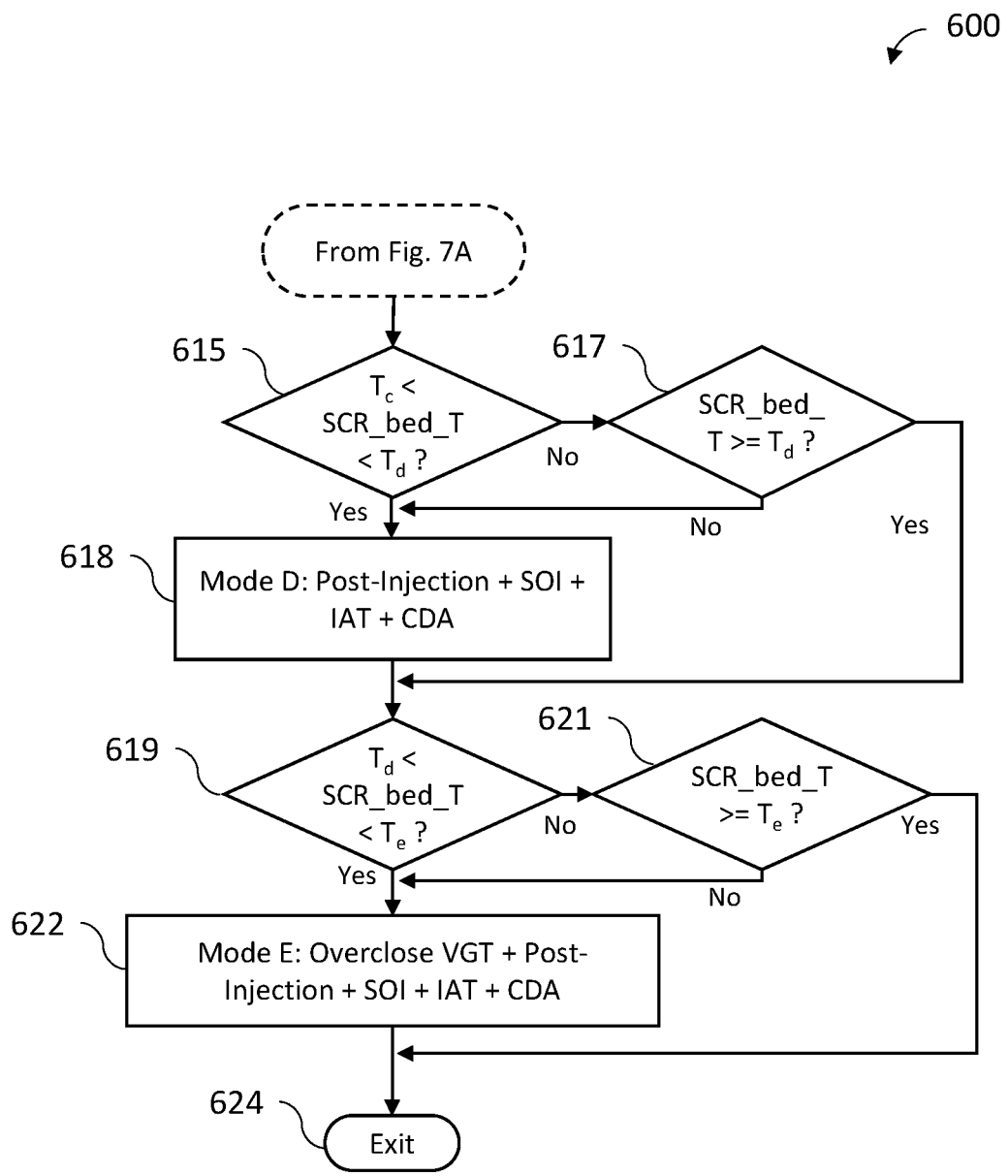

With reference to FIGS. 6A and 6B there is illustrated a flow diagram depicting certain aspects of an example procedure 600 for determining or effectuating one or more thermal management operating modes for an engine (e.g., determining or effectuating a set of one or more engine calibrations, controls, or operation commands) to establish and/or maintain desired exhaust or aftertreatment temperature characteristics. Procedure 600 may be implemented and performed to provide an enhanced or optimized aftertreatment thermal management strategy including cylinder deactivation (CDA). Procedure 600 may be also implemented and performed to provide an engine calibration or setting for aftertreatment warmup (e.g., warmup of NOx reduction systems such as SCR catalysts) in a structured manner to raise the catalyst bed temperature using CDA alone or in combination with additional controls (sometimes referred to as engine calibration levers or engine control levers) to enhance the thermal management effects and capability provided by CDA. It shall be appreciated that the term supplemental thermal management actions refers to and encompasses such controls and levers generally as well as the specific example controls or levers described herein including those described below in connection with process 600.

Figure 5:
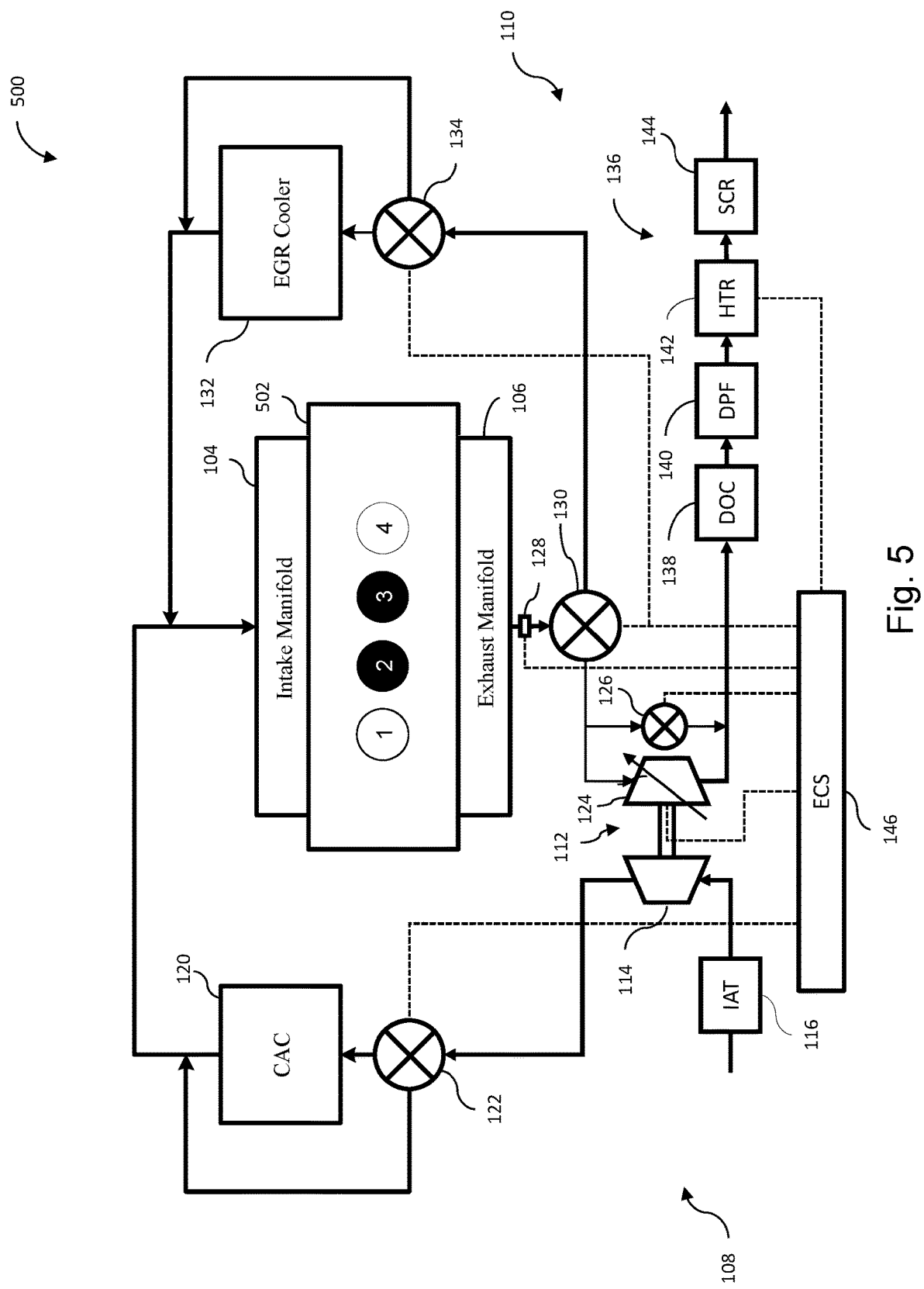
FIG. 5 is a schematic diagram illustrating certain aspects of another example internal combustion engine system.

Procedure 600 may be implemented and executed in connection with one or more components of the ECS 146 such as one or more of the components of the ECS 146 described above in connection with engine system 100 or in a number of other ECS components. It shall be appreciated that the engine system 100 may or may not be configured with the example components and controls illustrated and described in connection with FIGS. 1A, 1B, and 5. For example, one or more of the illustrated CAC bypass, EGR bypass, AT Heater, or other components may not be present in certain implementations of system 100. Procedure 600 utilizes a plurality of temperature values, also referred to as temperature thresholds, to determine thermal management modes for an engine.

In the illustrated example, procedure 600 utilizes a plurality of temperature thresholds comprising a first temperature threshold ($T_a$), a second temperature threshold ($T_b$), a third temperature threshold ($T_c$), a fourth temperature threshold ($T_d$), and a fifth temperature threshold ($T_e$) which increase sequentially ($T_a<T_b<T_c<T_d<T_e$). These temperature thresholds are associated with a number of thermal management modes, which may also be also considered and referred to as engine operating modes, and may be utilized in selecting between or among such modes and effectuating a selected mode. The thermal management modes may comprise one or more CDA-only modes and/or one or more modes in which CDA is combined with one or more additional thermal management operations. Other embodiments may utilize a subset of these temperature thresholds and associated operating modes or may utilize additional or alternative temperature thresholds and associated operating modes. It shall be appreciated that the terms and operators greater than (>) and less than (<) respectively include and encompass the terms and operators greater than or equal to (>=) and less than or equal (=<) unless explicitly stated to the contrary. It shall further be appreciated that the definition of thresholds relative to such terms and operators may select and associate the "equal to" condition with either of two thresholds or ranges unless explicitly stated to the contrary.

Procedure 600 begins at start operation 602 and then proceeds to conditional 603 which determines if an SCR catalyst bed temperature (SCR_bed_T) is less than a first temperature threshold ($T_a$), e.g., SCR_bed_T<$T_a$. The first temperature threshold may be configured, defined, or selected as a threshold below which a thermal management mode comprising at least CDA, and potentially comprising additional thermal management operations is selected or performed.

While directly measuring or sensing the SCR catalyst bed temperature bed may be theoretically possible, in practice the SCR catalyst bed temperature may be determined using a model based upon one or more indicia correlated with or indicative of a current SCR bed temperature. A number of models may be utilized, for example, the SCR catalyst bed temperature may be modeled based on one or more temperature measurements taken at various locations relative to an SCR catalyst, for example, an SCR catalyst inlet temperature, an SCR catalyst outlet temperature, a turbine outlet temperature, a temperature taken at other points along an exhaust flowpath including an SCR catalyst, or combinations of the foregoing and/or other indicia. The model may further account for the thermal mass of the SCR catalyst. The SCR catalyst bed temperature may be determined using one or more calculations, computations, estimations, approximations, or other techniques as will occur to one of skill in the art with the benefit of the present disclosure.

If conditional 603 determines or evaluates negative, procedure 600 repeats conditional 603. If conditional 603 determines or evaluates affirmative, procedure 600 proceeds to conditional 605 which determines whether an engine system is ready for operation in a thermal management mode. Conditional 605 may determine whether an engine system is ready for operation in a thermal management mode in response to a number of conditions in addition to the SCR catalyst bed temperature being less than the first temperature threshold. Such additional conditions may comprise one or more of: engine speed, engine load, emissions, and aftertreatment conditions such as temperatures and mass flow conditions.

If conditional 605 determines that the thermal management operating mode is not ready, procedure 600 repeats conditional 605. If conditional 605 determines that the thermal management operating mode is ready, procedure 600 proceeds to operation 606 which commands or controls an engine system to enter a first thermal management mode (Mode A) in which operates the engine with cylinder deactivation (CDA) turned on. CDA may be turned on continuously or dynamically varied with respect to duration of cylinder deactivation, selection of cylinders deactivated (or activated) and, as noted above, may involve different numbers and combinations of deactivated (or activated) cylinders depending on the characteristics and configuration of a given engine. It shall be appreciated that the first thermal management mode is an example of and may be referred to as a CDA-only operating mode. It shall further be appreciated that exhaust gas recirculation (EGR) may occur and may be controlled during such CDA-only operation with attendant effects on exhaust and aftertreatment temperatures. Additionally, it shall be appreciated that EGR may occur and may be controlled during the other thermal management modes described herein including those described in connection with procedure 600 below.

From operation 606, procedure 600 proceeds to conditional 607 which determines whether the SCR catalyst bed temperature is between or intermediate the first temperature threshold and a second temperature threshold ($T_b$), e.g., greater than the first temperature threshold and less than a second temperature threshold ($T_a$<SCR_bed_T<$T_b$). The second temperature threshold may be configured, defined, or selected as a threshold which may be utilized to select or perform at least one additional thermal management operation in combination with CDA, such as in the thermal management modes of procedure 600 described below.

If conditional 607 determines or evaluates affirmative, procedure 600 proceeds to operation 610 which commands or controls the engine system to enter a second thermal management mode (Mode B) in which cylinder deactivation is or remains on and an intake air throttle (IAT) position is closed at least in part relative to its current or nominal position. The positioning of the IAT may be determined using a lookup map or table which may comprise an array or matrix of intake air throttle position settings corresponding to one or more input parameters such as the SCR catalyst bed temperature.

If conditional 607 determines or evaluates negative, procedure 600 proceeds to conditional 609 which determines whether the SCR catalyst bed temperature is greater than or equal to the second temperature threshold. If conditional 609 determines or evaluates negative, procedure 600 proceeds to operation 610. If conditional 609 determines or evaluates affirmative, procedure 600 proceeds to conditional 611.

Conditional 611 determines whether the SCR catalyst bed temperature is between or intermediate the second temperature threshold and a third temperature threshold ($T_c$), e.g., whether the SCR catalyst bed temperature is greater than the second temperature threshold and less than a third temperature threshold ($T_b$<SCR_bed_T<$T_c$). The third temperature threshold may be configured, defined, or selected as a threshold which may be utilized to select or perform at least one additional thermal management operation in combination with CDA and the additional thermal management operation of Mode B, such as in the thermal management modes of procedure 600 described below.

If conditional 611 determines or evaluates affirmative, procedure 600 proceeds to operation 614 which commands or controls the engine system to enter a third thermal management mode (Mode C) in which cylinder deactivation is or remains on, the IAT is or remains closed at least in part, and the start of injection for a main fuel injection (Main_Inj_SOI) is retarded or delayed. The start of injection for a main fuel injection may be determined using a lookup map or table which may comprise an array or matrix of intake air throttle position settings corresponding to one or more input parameters such as the SCR catalyst bed temperature.

If conditional 611 determines or evaluates negative, procedure 600 proceeds to conditional 613 which determines whether the SCR catalyst bed temperature is greater than or equal to the third temperature threshold. If conditional 613 determines or evaluates negative, procedure 600 proceeds to operation 614. If conditional 613 determines or evaluates affirmative, procedure 600 proceeds to conditional 615.

Conditional 615 determines whether the SCR catalyst bed temperature is between or intermediate the third temperature threshold and a fourth temperature threshold ($T_d$), e.g., greater than the third temperature threshold and less than a fourth temperature threshold ($T_c$<SCR_bed_T<$T_d$). The fourth temperature threshold may be configured, defined, or selected as a threshold which may be utilized to select or perform at least one additional thermal management operation in combination with CDA and the additional thermal management operation of Mode C, such as in the thermal management modes of procedure 600 described below.

If conditional 615 determines or evaluates affirmative, procedure 600 proceeds to operation 618 which commands or controls the engine system to enter a fourth thermal management mode (Mode D) in which cylinder deactivation is or remains on, the IAT is or remains closed at least in part, the start of injection for a main fuel injection is or remains retarded or delayed, and one or more post injections (fuel injections after a main injection) are performed. The timing and quantity of the one or more post injections may be determined using a lookup map or table which may comprise an array or matrix of intake air throttle position settings corresponding to one or more input parameters such as the SCR catalyst bed temperature.

If conditional 615 determines or evaluates negative, procedure 600 proceeds to conditional 617 which determines whether the SCR catalyst bed temperature is greater than or equal to the fourth temperature threshold. If conditional 617 determines or evaluates negative, procedure 600 proceeds to operation 618. If conditional 617 determines or evaluates affirmative, procedure 600 proceeds to conditional 619.

Conditional 619 determines whether the SCR catalyst bed temperature is between or intermediate the fourth temperature threshold and a fifth temperature threshold ($T_e$), e.g., is greater than the fourth temperature threshold and less than a fifth temperature threshold ($T_d$<SCR_bed_T<$T_e$). The fourth temperature threshold may be configured, defined, or selected as a threshold which may be utilized to select or perform at least one additional thermal management operation in combination with CDA and the additional thermal management operation of Mode D, such as in the thermal management modes of procedure 600 described below. VGT overclosing may comprise reducing the turbine efficiency to very low levels (e.g., around 10%) to keep the turbine energy transfer to the compressor at corresponding very low levels so that the air-to-fuel ratio (A/F) is reduced and exhaust temperature is increased. Such operation may be performed in a number of operational states including very low engine load operation.

If conditional 619 determines or evaluates affirmative, procedure 600 proceeds to operation 622 which commands or controls the engine system to enter a fifth thermal management mode (Mode E) in which cylinder deactivation is or remains on, the IAT is or remains closed at least in part, the start of injection for a main fuel injection is or remains retarded or delayed, one or more post injections (fuel injections after a main injection) are or remain performed, and a variable geometry turbocharger (VGT) is adjusted to restrict its turbine geometry to increase exhaust temperature (e.g., by adjusting the VGT vanes, moveable wall, nozzle, or other adjustable turbine or turbocharger structures providing variable geometry) which is sometimes referred to as overclosing. A VGT over-closing adjustment may be determined using a lookup map or table which may comprise an array or matrix of intake air throttle position settings corresponding to one or more input parameters such as the SCR catalyst bed temperature.

If conditional 619 determines or evaluates negative, procedure 600 proceeds to conditional 621 which determines whether the SCR catalyst bed temperature is greater than or equal to the fifth temperature threshold. If conditional 621 determines or evaluates negative, procedure 600 proceeds to operation 622 and, from procedure 622, proceeds to end operation 625 and may thereafter repeat. If conditional 617 determines or evaluates affirmative, procedure 600 proceeds to end operation 624. Procedure 600 may then subsequently be reinitiate depending on several factors including engine speed, engine load, emissions, and aftertreatment temperature conditions or other aftertreatment conditions in order to reenter a thermal management mode and maintain an SCR bed temperature at a target temperature or in a target range or window.

In the illustrated example, procedure 600 utilizes several example engine calibration or control levers, including: IAT positioning (closing or over-closing), retarding fuel timing for start of injection (SOI), retarding one or more post-injections (fuel injections occurring after a prior injection such as one or more main or primary injections), and VGT positioning (closing or over-closing). Each of the example engine calibration or control levers may be configured or selected to provide aggressive thermal management minimizing or optimizing associated or attendant costs or disadvantages.

IAT over-closing may reduce airflow to cylinders, thereby reducing the air-to-fuel ratio (A/F) to raise exhaust temperature. Aggressive IAT closing may occur to a degree or level mapped a priori not to affect the engine combustion stability and also just avoiding the oil leaks past compressor seals.

Aggressive retarding SOI may be mapped a priori to a speed/load table to a level just avoiding misfire. Such timing can raise the exhaust fraction of energy from fuel injection but may reduce fuel efficiency significantly.

Aggressive retarding one or more post-injections can be performed primarily to raise tail end gas temperature (and ultimately exhaust temperature) and may involve a degree of in-cylinder combustion. Such timing can require a significant amount of fueling and, depending on engine operating conditions, may be up to 50% or more of the total fueling, resulting in a commensurate penalty to fuel economy.

Aggressive VGT over-closing may close the turbine of a variable geometry turbocharger (reducing the effective flow area) down to a level where the turbine efficiency is at a substantially degraded level (often 10% or below). This may reduce the airflow submitted to engine cylinders significantly (by severely reducing the power transmitted to the compressor) and, in turn, raising exhaust temperature faster and higher.

It shall be appreciated that such example engine calibration or control levers can be used in various combinations and sequences depending on the operating conditions and depending on engine characteristics or configurations. Thus, a number of modified sequences may be utilized in which combination including one or more such example engine calibration or control levers are added CDA operation to achieve enhanced CDA-based thermal management.

It shall be appreciated that the example sequence or staging of engine calibration or control levers and related thermal management modes of the illustrated embodiment of process 600 is generally ordered based on the increasing complexity from a performance viewpoint. In other forms, the sequence of the additional engine calibration or control levers may be provided in other orders to achieve or optimize other control objectives. Table 1 below illustrates catalyst temperature ranges (high-to-low) that may be used to control various respective combinations or sequences of engine calibration or control levers and related thermal management modes. Depending on engine conditions, some forms of procedure 600 can choose to apply these combinations in the low load range, for faster exhaust temperature raise and reaching higher temperature window thresholds. Some examples of such combinations are set forth in Table 1 below, it being appreciated that a variety of other combinations are contemplated.

TABLE 1

| Catalyst Temperature Range | Engine Calibration or Control Levers |
| --- | --- |
| 260-220 degrees C. | CDA + delayed or retarded SOI |
| 270-180 degrees C. | CDA + delayed or retarded SOI + delayed or retarded post fueling |

TABLE 1-continued

| Catalyst Temperature Range | Engine Calibration or Control Levers |
| --- | --- |
| 280-100 degrees C. | CDA + delayed or retarded SOI + delayed or retarded post fueling + VGT adjustment or over-closing |

Figure 7:
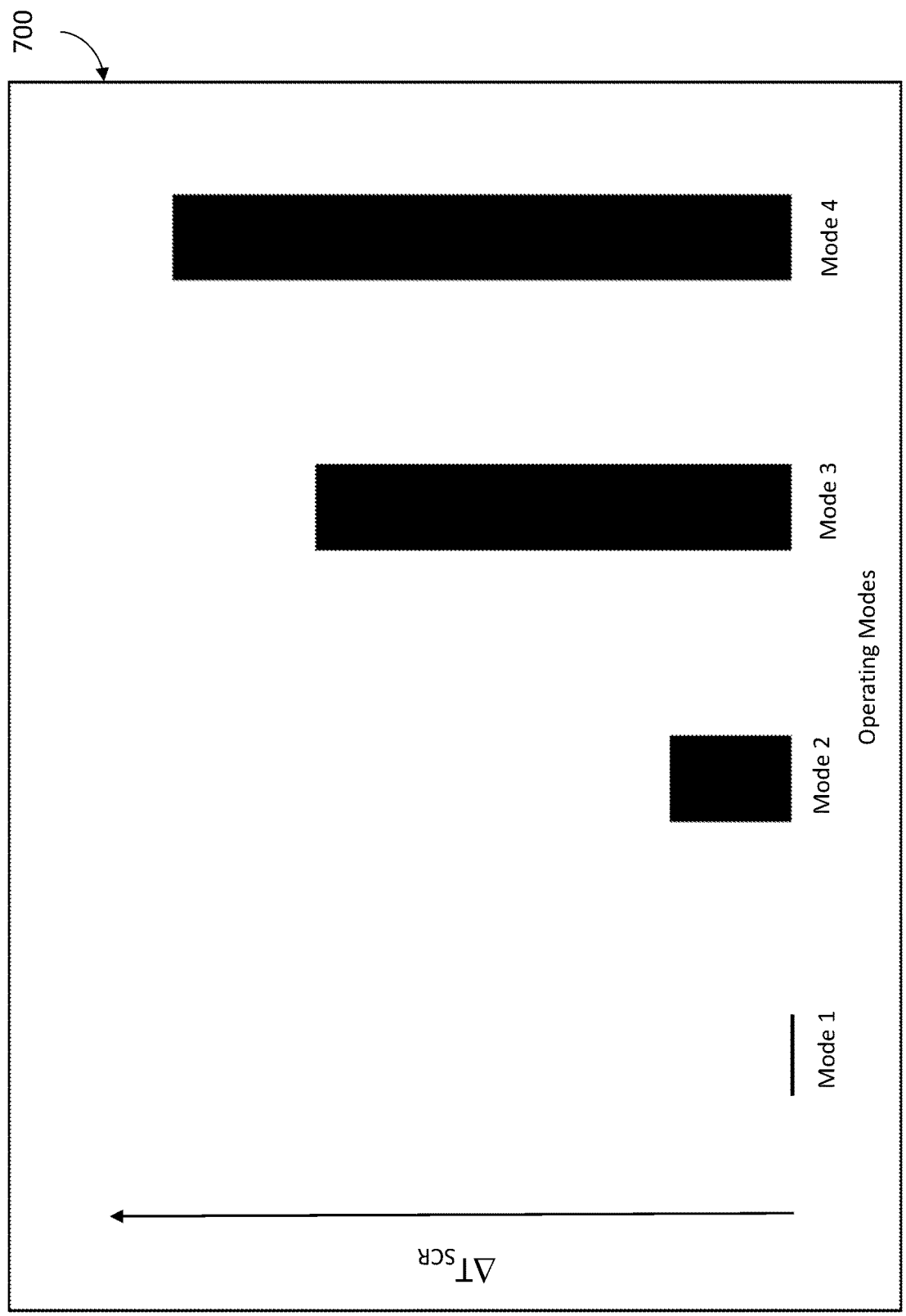
FIG. 7 is a set of graphs depicting certain operational parameters provided by a number of control modalities.

With reference to FIG. 7, there is illustrated a graph 700 depicting an example of changes in SCR catalyst bed temperature ($\Box T_{SCR}$) in degrees C. for several operating modes. In the example of FIG. 7, the engine is operating at low idle conditions. A first operating mode (Mode 1) is a baseline mode which does not perform any CDA or other thermal management operations and therefore does not increase SCR catalyst bed temperature. A second operating mode (Mode 2) performs CDA comprising deactivation of three cylinders of a six-cylinder engine without any other thermal management operations and provides a first increase in SCR catalyst bed temperature. The magnitude of the first increases in SCR catalyst bed temperature may be, for example, about 40-50 5 degrees C., it being appreciated that the magnitude will vary for different engines and different operating modes. A third operating mode (Mode 3) perform CDA comprising deactivation of three cylinders of a six-cylinder engine with additional aggressive thermal management according to the present disclosure and provides a second increase in SCR catalyst bed temperature which is about four times the magnitude of the first increase. A fourth operating mode (Mode 4) perform CDA comprising deactivation of four cylinders of a six-cylinder engine with additional aggressive thermal management according to the present disclosure and provides a third increase in SCR catalyst bed temperature which is about five times the magnitude of the first increase. Graph 700 illustrates one example of how significantly higher SCR catalyst temperature differentials from a baseline are possible different combinations of the enhanced CDA techniques disclosed herein.

Figure 8:
FIG. 8 is a set of graphs depicting certain operational parameters provided by a number of control modalities.

FIG. 8 illustrates a graph 800 depicting an example of changes in air-to-fuel ratio (A/F) for the foregoing operating modes. Mode 1 provides a baseline A/F. The value of the baseline A/F will vary for different engines and different operating modes. Mode 2 provides an A/F which is about 60% of the magnitude of the baseline A/F. Mode 3 provides an A/F of which is about 45% of the magnitude of the baseline A/F. Mode 4 provides an A/F which is about 30% of the magnitude of the baseline A/F. In the example of FIG. 8, the engine is operating at low idle conditions corresponding to those of graphs 700 illustrated and described in connection with FIG. 7.

It shall be appreciated that light engine loads are an example of conditions posing significant challenges to increasing and maintaining SCR catalyst temperature. Reducing A/F generally increases exhaust temperatures and, in turn, SCR catalyst temperature. At light loads, however, some engines, such as Diesel engines, generally operate at very high A/Fs. Reduction of A/F under such conditions has to be quite significant, in order to result in reasonable raise in exhaust temperatures as compared to baseline. Low idle conditions, such as those of the present example, are challenging conditions to reduce A/F significantly. In the present example, A/F is reduced to almost allowable lower limits for the stable engine operation (below which the engine could run into smoke and instability issues). This significant reduction in A/F is possible with the enhanced CDA thermal management techniques disclosed herein.

It shall be appreciated that the present disclosure encompasses a plurality of embodiments including the following examples. A first example embodiment is a method of controlling operation of an internal combustion engine, the method comprising: performing a cylinder deactivation (CDA) operation while running the engine; determining at least one of a plurality of supplemental thermal management actions effective to increase an exhaust temperature above a CDA-only temperature; and performing the at least one of the plurality of temperature maintenance actions effective to increase the exhaust temperature, wherein the act of determining comprises evaluating temperature value indicative of an SCR bed temperature relative to at least a first temperature threshold and a second temperature threshold greater than the first temperature threshold, selecting at least a first one of the plurality of supplemental thermal management actions in response to the temperature value indicative of the SCR bed temperature being in a first temperature range relative to the first temperature threshold and the second temperature threshold, and selecting at least a second one of the plurality of supplemental thermal management actions in response to the temperature value indicative of the SCR bed temperature being in a second range relative to the first temperature threshold and the second temperature threshold.

In some forms of the first example embodiment, the first range comprises one or more temperatures intermediate the first temperature threshold and the second temperature threshold. In some forms of the first example embodiment, the second range comprises one or more temperatures exceeding the second temperature threshold. In some forms of the first example embodiment, the act of determining comprises evaluating temperature value indicative of an SCR bed temperature relative to at least the first temperature threshold, the second temperature threshold, and a third temperature threshold greater than the second temperature threshold. In some forms of the first example embodiment, the act of determining comprises selecting at least a third one of the plurality of supplemental thermal management actions in response to the temperature value indicative of the SCR bed temperature being in a third range intermediate the second temperature threshold and the third temperature threshold. In some forms of the first example embodiment, the method comprises at least one of: (a) the at least a first one of the plurality of supplemental thermal management comprises a single supplemental thermal management action, (b) the at least a second one of the plurality of supplemental thermal management comprises at least two supplemental thermal management action, and (c) the at least a third one of the plurality of supplemental thermal management comprises at least three supplemental thermal management actions. In some forms of the first example embodiment, the plurality of temperature maintenance actions comprise adjusting an intake air throttle, retarding start-of-injection of a main fuel injection, retarding a post-injection, and adjusting a turbocharger turbine geometry.

A second example embodiment is an electronic control system configured to control operation of an internal combustion engine, the electronic control system comprising: at least one an integrated circuit-based controller; at least one non-transitory controller-readable memory operatively coupled with and configured with instructions executable by the least one an integrated circuit-based controller to perform the acts of: performing a cylinder deactivation (CDA) operation while running the engine; determining at least one of a plurality of supplemental thermal management actions effective to increase an exhaust temperature above a CDA-only temperature; and performing the at least one of the plurality of temperature maintenance actions effective to increase the exhaust temperature, wherein the act of determining comprises evaluating temperature value indicative of an SCR bed temperature relative to at least a first temperature threshold and a second temperature threshold greater than the first temperature threshold, selecting at least a first one of the plurality of supplemental thermal management actions in response to the temperature value indicative of the SCR bed temperature being in a first temperature range relative to the first temperature threshold and the second temperature threshold, and selecting at least a second one of the plurality of supplemental thermal management actions in response to the temperature value indicative of the SCR bed temperature being in a second range relative to the first temperature threshold and the second temperature threshold.

In some forms of the second example embodiment, the first range comprises one or more temperatures intermediate the first temperature threshold and the second temperature threshold. In some forms of the second example embodiment, the second range comprises one or more temperatures exceeding the second temperature threshold. In some forms of the second example embodiment, the act of determining comprises evaluating temperature value indicative of an SCR bed temperature relative to at least the first temperature threshold, the second temperature threshold, and a third temperature threshold greater than the second temperature threshold. In some forms of the second example embodiment, the act of determining comprises selecting at least a third one of the plurality of supplemental thermal management actions in response to the temperature value indicative of the SCR bed temperature being in a third range intermediate the second temperature threshold and the third temperature threshold. In some forms of the second example embodiment, at least one of: (a) the at least a first one of the plurality of supplemental thermal management comprises a single supplemental thermal management action, (b) the at least a second one of the plurality of supplemental thermal management comprises at least two supplemental thermal management action, and (c) the at least a third one of the plurality of supplemental thermal management comprises at least three supplemental thermal management actions. In some forms of the second example embodiment, the plurality of temperature maintenance actions comprise adjusting an intake air throttle, retarding start-of-injection of a main fuel injection, retarding a post-injection, and adjusting a turbocharger turbine geometry.

A third example embodiment is a vehicle system comprising: an internal combustion engine; at least one an integrated circuit-based controller configured to control operation of the internal combustion engine; at least one non-transitory controller-readable memory operatively coupled with and configured with instructions executable by the least one an integrated circuit-based controller to perform the acts of: performing a cylinder deactivation (CDA) operation while running the engine; determining at least one of a plurality of supplemental thermal management actions effective to increase an exhaust temperature above a CDA-only temperature; and performing the at least one of the plurality of temperature maintenance actions effective to increase the exhaust temperature, wherein the act of determining comprises evaluating temperature value indicative of an SCR bed temperature relative to at least a first temperature threshold and a second temperature threshold greater than the first temperature threshold, selecting at least a first one of the plurality of supplemental thermal management actions in response to the temperature value indicative of the SCR bed temperature being in a first temperature range relative to the first temperature threshold and the second temperature threshold, and selecting at least a second one of the plurality of supplemental thermal management actions in response to the temperature value indicative of the SCR bed temperature being in a second range relative to the first temperature threshold and the second temperature threshold.

In some forms of the third example embodiment, the first range comprises one or more temperatures intermediate the first temperature threshold and the second temperature threshold. In some forms of the third example embodiment, the second range comprises one or more temperatures exceeding the second temperature threshold. In some forms of the third example embodiment, the act of determining comprises evaluating temperature value indicative of an SCR bed temperature relative to at least the first temperature threshold, the second temperature threshold, and a third temperature threshold greater than the second temperature threshold, and selecting at least a third one of the plurality of supplemental thermal management actions in response to the temperature value indicative of the SCR bed temperature being in a third range intermediate the second temperature threshold and the third temperature threshold. In some forms of the third example embodiment, at least one of: (a) the at least a first one of the plurality of supplemental thermal management comprises a single supplemental thermal management action, (b) the at least a second one of the plurality of supplemental thermal management comprises at least two supplemental thermal management action, and (c) the at least a third one of the plurality of supplemental thermal management comprises at least three supplemental thermal management actions. In some forms of the third example embodiment, the plurality of temperature maintenance actions comprise adjusting an intake air throttle, retarding start-of-injection of a main fuel injection, retarding a post-injection, and adjusting a turbocharger turbine geometry.

A fourth example embodiment is a method of controlling operation of an internal combustion engine, the method comprising: performing a cylinder deactivation operation while running the engine; selecting at least one of a plurality of temperature maintenance actions to increase an exhaust temperature; and performing the at least one of the plurality of temperature maintenance actions effective to increase the exhaust temperature, wherein the plurality of temperature maintenance actions include a charge air cooler bypass operation, an engine gas recirculation (EGR) cooler bypass operation, an aftertreatment system heater operation, an intake heater operation, a turbocharger bypass operation, a turbocharger geometry adjustment operation, and a delayed injection timing operation.

In some forms of the fourth example embodiment, the act selecting includes the acts of: (a) evaluating whether a first one of the plurality of temperature maintenance actions is available, (b) if the first one of the plurality of temperature maintenance actions is available, evaluating whether a temperature change provided by the first one of the temperature maintenance actions satisfies a target criterion, and (c) if either the first one of the plurality of temperature maintenance actions is not available or the temperature change magnitude provided by the first one of the temperature maintenance actions does not satisfy the target criterion, evaluating whether a second one of the plurality of temperature maintenance actions is available. In some forms of the fourth example embodiment, the act of evaluating whether a temperature change provided by the first one of the temperature maintenance actions satisfies a target criterion includes evaluating a predicted or estimated change in exhaust temperature magnitude relative to a magnitude target. In some forms of the fourth example embodiment, the act of evaluating whether a temperature change provided by the first one of the temperature maintenance actions satisfies a target criterion includes evaluating a predicted or estimated timing or rate of change in exhaust temperature magnitude relative to a timing or rate of change target. In some forms of the fourth example embodiment, the acts (b) and (c) are repeated for each of the plurality of temperature maintenance actions after said first one and said second one. In some forms of the fourth example embodiment, the act of selecting at least one of the plurality of temperature maintenance actions to increase an exhaust temperature includes evaluating the plurality of temperature maintenance actions in one of a predetermined order and a dynamically determined order, the dynamically determined order being responsive to operating conditions of the engine. In some forms of the fourth example embodiment, the delayed injection timing operation includes performing at least one delayed fuel injection into one or more operating cylinders while one or more other cylinders are deactivated. In some forms of the fourth example embodiment, the at least one delayed injection timing is at least 45 degrees after top dead center. In some forms of the fourth example embodiment, the delayed injection timing is during an exhaust stroke. In some forms of the fourth example embodiment, the method comprises reversing the at least one of the plurality of temperature maintenance actions responsive to exiting the cylinder deactivation operation.

A fifth example embodiment is a system comprising: an internal combustion engine and a controller operatively coupled with the internal combustion engine, wherein the controller is configured to: perform a cylinder deactivation operation while running the engine; select at least one of a plurality of temperature maintenance actions to increase an exhaust temperature; and perform the at least one of the plurality of temperature maintenance actions effective to increase the exhaust temperature, wherein the plurality of temperature maintenance actions include a charge air cooler bypass operation, an EGR cooler bypass operation, an aftertreatment system heater operation, a turbocharger bypass operation, a turbocharger geometry adjustment operation, and a delayed injection timing operation.

In some forms of the fifth example embodiment, to select at least one of the plurality of temperature maintenance actions to increase an exhaust temperature the controller is configured to perform the acts of: (a) evaluating whether a first one of the plurality of temperature maintenance actions is available, (b) if the first one of the plurality of temperature maintenance actions is available, evaluating whether a temperature change provided by the first one of the temperature maintenance actions satisfies a target criterion, and (c) if either the first one of the plurality of temperature maintenance actions is not available or the temperature change magnitude provided by the first one of the temperature maintenance actions does not satisfy the target criterion, evaluating whether a second one of the plurality of temperature maintenance actions is available. In some forms of the fifth example embodiment, the act of evaluating whether a temperature change provided by the first one of the temperature maintenance actions satisfies a target criterion includes evaluating a predicted or estimated change in exhaust temperature magnitude relative to a magnitude target. In some forms of the fifth example embodiment, the act of evaluating whether a temperature change provided by the first one of the temperature maintenance actions satisfies a target criterion includes evaluating a predicted or estimated timing or rate of change in exhaust temperature magnitude relative to a timing or rate of change target. In some forms of the fifth example embodiment, the acts (b) and (c) are repeated for each of the plurality of temperature maintenance actions after said first one and said second one. In some forms of the fifth example embodiment, to select at least one of the plurality of temperature maintenance actions to increase an exhaust temperature the controller is configured to evaluate the plurality of temperature maintenance actions in one of a predetermined order and a dynamically determined order, the dynamically determined order being responsive to operating conditions of the engine. In some forms of the fifth example embodiment, the delayed injection timing operation includes performing at least one delayed fuel injection into one or more operating cylinders while one or more other cylinders are deactivated. In some forms of the fifth example embodiment, the delayed injection timing is at least 45 degrees after top dead center. In some forms of the fifth example embodiment, the delayed injection timing is during an exhaust stroke. In some forms of the fifth example embodiment, the method comprises reversing the at least one of the plurality of temperature maintenance actions responsive to exiting the cylinder deactivation operation.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
an internal combustion engine and a controller operatively coupled with the internal combustion engine, wherein the controller is configured to:
perform a cylinder deactivation operation while running the engine;
select at least one of a plurality of temperature maintenance actions to increase an exhaust temperature including (a) evaluating whether a first one of the plurality of temperature maintenance actions is available, (b) if the first one of the plurality of temperature maintenance actions is available, evaluating whether a temperature change provided by the first one of the temperature maintenance actions satisfies at least one target criterion including evaluating a predicted or estimated timing or rate of change in exhaust temperature magnitude relative to a timing or rate of change target, and (c) if either the first one of the plurality of temperature maintenance actions is not available or the temperature change provided by the first one of the temperature maintenance actions does not satisfy the target criterion, evaluating whether a second one of the plurality of temperature maintenance actions is available; and
perform the at least one of the plurality of temperature maintenance actions effective to increase the exhaust temperature,
wherein the plurality of temperature maintenance actions include at least two of: a charge air cooler bypass operation, an EGR cooler bypass operation, an aftertreatment system heater operation, a turbocharger bypass operation, a turbocharger geometry adjustment operation, and a delayed injection timing operation.

2. The system of claim 1 wherein, the act of evaluating whether a temperature change provided by the first one of the temperature maintenance actions satisfies at least one target criterion includes evaluating a predicted or estimated change in exhaust temperature magnitude relative to a magnitude target.

3. The system of claim 1, wherein the acts (b) and (c) are repeated for each of the plurality of temperature maintenance actions after said first one and said second one.

4. The system of claim 1, wherein to select at least one of the plurality of temperature maintenance actions to increase an exhaust temperature the controller is configured to evaluate the plurality of temperature maintenance actions in one of a predetermined order and a dynamically determined order, the dynamically determined order being responsive to operating conditions of the engine.

5. The system of claim 1, wherein the delayed injection timing operation includes performing at least one delayed fuel injection into one or more operating cylinders while one or more other cylinders are deactivated.

6. The system of claim 5 wherein the delayed injection timing is at least 45 degrees after top dead center.

7. The system of claim 5 wherein the delayed injection timing is during an exhaust stroke.

8. The system of claim 1, comprising reversing the at least one of the plurality of temperature maintenance actions responsive to exiting the cylinder deactivation operation.

9. A system comprising:
an internal combustion engine and a controller operatively coupled with the internal combustion engine, wherein the controller is configured to:
perform a cylinder deactivation operation while running the engine;
select at least one of a plurality of temperature maintenance actions to increase an exhaust temperature including
(a) determining whether a first one of the plurality of temperature maintenance actions is available,
(b) if the first one of the plurality of temperature maintenance actions is available, evaluating whether a temperature change provided by the first one of the temperature maintenance actions satisfies at least one target criterion including evaluating a predicted or estimated timing or rate of change in exhaust temperature magnitude relative to a timing or rate of change target, and
(c) if either the first one of the plurality of temperature maintenance actions is not available or the temperature change provided by the first one of the temperature maintenance actions does not satisfy the target criterion, evaluating whether a second one of the plurality of temperature maintenance actions is available; and
perform the at least one of the plurality of temperature maintenance actions effective to increase the exhaust temperature.

10. The system of claim 9 wherein, the act of evaluating whether a temperature change provided by the first one of the temperature maintenance actions satisfies at least one target criterion includes evaluating a predicted or estimated change in exhaust temperature magnitude relative to a magnitude target.

11. The system of claim 9, wherein the acts (b) and (c) are repeated for each of the plurality of temperature maintenance actions after said first one and said second one.

12. The system of claim 9, wherein to select at least one of the plurality of temperature maintenance actions to increase an exhaust temperature the controller is configured to evaluate the plurality of temperature maintenance actions in one of a predetermined order and a dynamically determined order, the dynamically determined order being responsive to operating conditions of the engine.

13. A method of controlling an internal combustion engine, the method comprising:
performing a cylinder deactivation operation while running the engine;
selecting at least one of a plurality of temperature maintenance actions to increase an exhaust temperature including
(a) determining whether a first one of the plurality of temperature maintenance actions is available,
(b) if the first one of the plurality of temperature maintenance actions is available, evaluating whether a temperature change provided by the first one of the temperature maintenance actions satisfies at least one target criterion including evaluating a predicted or estimated timing or rate of change in exhaust temperature magnitude relative to a timing or rate of change target, and
(c) if either the first one of the plurality of temperature maintenance actions is not available or the temperature change provided by the first one of the temperature maintenance actions does not satisfy the target criterion, evaluating whether a second one of the plurality of temperature maintenance actions is available; and
performing the at least one of the plurality of temperature maintenance actions effective to increase the exhaust temperature.

14. The method of claim 13 wherein, the act of evaluating whether a temperature change provided by the first one of the temperature maintenance actions satisfies at least one target criterion includes evaluating a predicted or estimated change in exhaust temperature magnitude relative to a magnitude target.

15. The method of claim 13, wherein the acts (b) and (c) are repeated for each of the plurality of temperature maintenance actions after said first one and said second one.

16. The method of claim 13, wherein to select at least one of the plurality of temperature maintenance actions to increase an exhaust temperature the controller is configured to evaluate the plurality of temperature maintenance actions in one of a predetermined order and a dynamically determined order, the dynamically determined order being responsive to operating conditions of the engine.

17. The method of claim 13, wherein the plurality of temperature maintenance actions include at least one of a charge air cooler bypass operation, an EGR cooler bypass operation, an aftertreatment system heater operation, a turbocharger bypass operation, a turbocharger geometry adjustment operation, and a delayed injection timing operation.

18. The method of claim 13, wherein the first one of the plurality of temperature maintenance actions is a charge air cooler bypass operation.

19. The method of claim 13, wherein the second one of the plurality of temperature maintenance actions is an EGR cooler bypass operation.

* * * * *